United States Patent Office 2,985,692
Patented May 23, 1961

2,985,692
MANUFACTURE OF ALKYL MAGNESIUM COMPOUNDS

Harold E. Podall, Arlington, Va., assignor to Ethyl Corporation, New York, N.Y., a corporation of Delaware No Drawing. Filed Jan. 27, 1959, Ser. No. 789,250

5 Claims. (Cl. 260—665)

This invention relates to the manufacture of alkyl compounds of magnesium. More particularly the invention concerns a new and efficient process for the manufacture of these useful organometallic materials.

Alkyl magnesium compounds are becoming of increasing interest as intermediates in the manufacture of a number of chemical compounds as a highly effective replacement for the Grignard reagent. Grignard reagents, although well known in the chemical field, are objectional in that they require alkyl halide, a relatively expensive reactant for their preparation. The magnesium alkyl compounds of the present invention are useful in reaction with many salts or oxides and metals to form corresponding metal alkyls. For example, a typical product of the present invention, diethyl magnesium, is particularly suitable for the conversion of metal halides to alkyl derivatives, for example the reaction with a mercury halide or with a lead chloride to produce the corresponding metal alkyl.

The principal methods for preparation of magnesium alkyls, heretofore known, are classical laboratory preparative techniques which are not suitable for commercial processes. These techniques or reactions include, for example, the disproportionation of a Grignard reagent to produce the magnesium dialkyl and a magnesium halide, for example:

$$2RMgX \rightarrow R_2Mg + MgX_2$$

It is seen that this procedure is inefficient, as a commercial method, because half of the magnesium results as a degraded product, magnesium chloride, which must be further treated to convert the magnesium into utilizable form. Another laboratory preparative technique involves the reaction of a more expensive, but easily prepared organometallic, such as a diethylmercury with magnesium metal. This results in the formation of the diethylmagnesium and releases mercury. It is clear that the raw materials involved in such an operation are quite expensive and that extremely high recoveries are necessarily involved. These factors mitigate against commercial preparation of the dialkylmagnesium compound. In view of the commercial importance and versatility of the magnesium alkyl products, it is apparent that an improved method for the economical and commercial production thereof is in great demand.

An object of the present invention is, generally, to provide an improved process for the manufacture of alkyl magnesium compounds. A more particular object is to provide a more economical and direct route to magnesium alkyl compounds, readily carried out on a commercial scale, and utilizing a minimum of process operations and economical and readily provided raw materials. A further specific object is to provide a process for the production of the dialkyl magnesium compounds directly from the readily produced feed component, magnesium hydride, and from an olefin hydrocarbon. A further specific object is to provide a synthesis method for making the dialkyl magnesium compounds, which is further readily adapted to efficient recovery of the desired product compound. Other objects will appear hereinafter.

It is now found that the combination and reaction of olefin hydrocarbons with magnesium hydride compounds can be very efficiently carried out by reacting these components in the presence of suitable quantities of a reaction medium which is or comprises a coordinating sulfur compound consisting of a member of the group consisting of a thioether, a sulfoxide, or a sulfone. The magnesium hydride reagent employed in the various embodiments of the invention is in a comminuted state, and preferably is very finely subdivided. The magnesium hydride is not highly soluble in any of the materials employed as reaction media and a high degree of available surface is desirable. The process is carried out under pressures which can vary from substantially atmospheric up to 200 atmospheres' pressure if desired, although such elevated pressures are rarely necessary. The temperatures employed can be from about 50 up to about 200° C., or even higher in certain cases, but a preferred temperature range is from about 70 to 120° C. The choice of explicit conditions for a particular embodiment depends to some extent upon the character of the olefin hydrocarbon being reacted. Thus, for the normally gaseous olefins such as ethylene and propylene, elevated pressures are highly desirable to assure efficient and effective contact and reaction between the olefin reagent and the magnesium hydride.

The precise reason for the effectiveness of the sulfur compounds which are employed as the reaction media, or as components of the reaction media in the embodiments of the invention, is not fully understood. It is known that the sulfoxide, sulfone, and thioether sulfur compounds are highly stable materials which nevertheless are capable of being electron donors. In other words, the sulfur and oxygen atoms therein have an excess of electrons available for coordination of other materials. A substantial degree of latitude with respect to selection of any specific sulfur compound for a given example is permissible. The most readily available and actually preferred compounds are those wherein the radicals are purely hydrocarbon radicals. Illustrative of such instances are the following: dimethyl sulfoxide, diethyl sulfoxide, diisopropyl sulfoxide, mixed sulfoxides such as methyl-ethyl sulfoxide, the simple thioethers such as dimethylthioether, diethylthioether, dibutylthioether, and others readily ascertainable by those skilled in the art. Similar latitude is provided when a sulfone is employed. Illustrative of the sulfones are dimethylsulfone, diethylsulfone, methyl ethylsulfone, di-n-butylsulfone, and the like. Although the simple sulfur compounds enumerated above are preferred, because of their relative molecular simplicity and ready availability at economical prices, employment of more complex sulfur compounds is not prohibited. By this is meant that the use of compounds of the indicated categories having substituted hydrocarbon radical substituents of at least cerain character is not precluded. Illustrative of the substituents which are permissible, one or several halogen atoms on an aryl substituent is permitted. Similarly, the radical of a sulfur compound can be an aralkyl or an alkaryl compound, or, as shown in the examples below, can be a diaryl compound. Illustrative of these gradations of solvent or adjuvant component availability is the following list: Methyl phenylsulfoxide, di-p-tolylthioether, di-p-chlorophenylthioether, methyl phenylsulfone, di-p-anisylsulfoxide, etc.

When members of the foregoing group are employed as alternatives or substitutes for the solvents or reaction media which are discusssed in the examples below, either equivalent or similar results can be achieved with respect to effective formation of the diethyl or dialkyl magnesium compounds. Diaryl compounds are frequently highly desirable, especially when available at moderate cost. In addition aralkyl hydrocarbon radicals can be effectively utilized or present in the various embodiments. Illustrative of such are dibenzyl thioethers, dibenzyl sulfoxide, and other illustrations.

The olefins available in embodiments of the process to form the desired alkyl magnesium compounds are numerous. Most of interest are the low molecular weight normally gaseous olefins ethylene and propylene. The straight chain olefins of slightly higher molecular weight such as 1-butene, 2-butene, or isobutylene, are also of great economic significance. However, when desired higher molecular weight olefins are frequently available and are satisfactorily employed, the best results being achieved with the alpha-olefins or 1-alkenes. In some instances it will be found advantageous to utilize the present process when the olefin reactant includes an aryl substituent. Thus styrene is a suitable reagent to be employed. Others will be readily ascertainable by those skilled in the art.

In carrying out the process, as indicated, a sufficient quantity of reaction liquid medium is provided so that the reacting system is a relatively mobile, thin slurry of the magnesium hydride solids in the liquid phase. The reaction technique can be carried out either in cyclic, true batch, or continuous type operations. By batch is meant that all the reagents are introduced to a reaction zone at one time, and no further additions are found necessary. In the case of a cyclic operation, the magnesium hydride, reaction medium, and an initial quantity of olefin is introduced, and reaction conditions are established. During a reaction period, additional olefin can be supplied, particularly in the case of normally gaseous olefins, by adding or maintaining gaseous pressure. It will be understood that the precise mode of carrying out a reaction is not a limiting factor of the invention. During the reaction period, the olefin hydrocarbon adds to the magnesium hydride bond or bonds, and forms the desired alkyl magnesium compound which is normally soluble in the reaction medium in the proportions employed. Accordingly, the cyclic type of operation permits withdrawal of a portion of the reaction medium, or of the reaction mixture when desired, and separation of the unreacted magnesium hydride solids therefrom. The alkyl magnesium compound product is readily isolated by vacuum distilling, the solvent leaving behind the product, usually as a dry solid.

As will appear hereinafter, the coordinating, sulfur-containing compounds employed as reaction media liquids, or as components of the reaction media exhibit a plurality of benefits and effects in that they appear to act as adjuvants or catalysts for the reaction, and at the same time are highly effective in facilitating recovery and separation of the reacted mixture components. The use of additional catalyst additives is not precluded, although in many instances further catalytic additives will not be required to achieve a rapid reaction with good conversion and yield.

The details of the invention and the manner of carrying it out and of achieving the benefits therefrom will be readily understood from the detailed description and examples given hereinafter. Except where otherwise stated, all proportions and quantities are in weight units.

*Example I*

This example illustrates a highly desirable embodiment of the invention for the production of diethyl magnesium. About 100 parts of finely divided magnesium hydride was charged to an autoclave under carefully preserved anhydrous conditions and in the absence of atmospheric oxygen. In addition, approximately 15,000 parts by weight of dimethyl sulfoxide, $(CH_3)_2SO$ was inserted. The autoclave was provided with internal agitation means. The autoclave was purged thrice by applying 30 atmospheres' ethylene pressure and then venting. The temperature of the reactor and contents was then raised to approximately 100° C., and concurrently a pressure of ethylene gas was applied amounting to approximately 66 atmospheres' pressure. The contact under these conditions, and with rigorous agitation, was continued for three hours and beyond. At the end of three hours, it was found that 4 percent of the original magnesium content had been converted to diethyl magnesium, and the conversion represented a high yield of the order of at least 80 percent of the magnesium hydride reacted.

Portions of the reaction medium are treated by cooling to room temperature and then vacuum distilling the dimethyl sulfoxide therefrom, leaving a solid product. The reaction medium is withdrawn from the reaction zone either after an initial settling of the unreacted magnesium hydride present, or the thin slurry therein is withdrawn as such and filtered to isolate a liquid phase, from which the diethyl magnesium is isolated as described.

The high degree of benefits achieved by the present process are clear by contrast of the foregoing results with the following example illustrating an attempt to produce diethyl magnesium in the absence of the reaction medium employed according to the present invention.

*Example II*

The procedure of Example I above was essentially repeated, except that the magnesium hydride charged was about 100 parts, and in addition, the reaction mixture was formed by adding 13,000 parts of diethyl ether. The contentts were raised in temperature to about 100° C., and vigorously agitated while applying an ethylene pressure of about 1,000 pounds per square inch, or 66 atmospheres, was applied. Even after a reaction period of approximately 43 hours, only two percent of the magnesium compound originally charged had been converted to an alkyl magnesium product, and the said product was predominantly dibutyl magnesium. This illustrates that, when extended reaction periods are involved that a certain degree of dimerization or increase in alkyl chain length occurs which is undesirable when a specific alkyl magnesium compound is desired.

It is thus apparent that the operation of Example I was responsible for a high difference of at least 100 percent in conversion of the magnesium component charged to the desired dialkyl magnesium product, and also that the reaction period was only 7 percent of the time.

To illustrate the application of the invention with a typical thioether as the reaction medium, the following example is illustrative.

*Example III*

The procedure of Example I was substantially repeated except that the charge in this instance consisted of 260 parts of magnesium hydride and 1,000 parts of diethyl thioether. An ethylene partial pressure of approximately 800 p.s.i.g. is applied and the reaction system maintained at about 130° for a period of about 4 hours. A high conversion of the magnesium hydride is achieved with a corresponding high degree of yield to form diethyl magnesium upon withdrawal of the reacted system, separation of any solid portions, and recovery of the diethyl magnesium.

As mentioned heretofore, the liquids employed as reaction media need not be confined to the alkyl sulfur compounds of the class recited. Thus, in some cases, the aryl compounds are highly desirable as in the following example.

*Example IV*

In this operation, the charge to the reactor included 100 parts of magnesium hydride and 1,000 parts of diphenyl sulfoxide, $(C_6H_5)_2SO$. The operating conditions are as follows: A temperature of about 130° C., and an application of 500 p.s.i.g. of propylene pressure (33 atmospheres) for a reaction period of about 3 hours.

The operation results in a high degree of conversion of the magnesium to desired products with a high yield of diisopropyl magnesium.

*Example V*

When the operation of Example I is repeated, but using 1,000 p.s.i.g. of propylene pressure to supply the desired olefin, and 1,000 parts of methyl sulfoxide as the desired reaction medium liquid, comparable results are achieved.

As indicated heretofore, olefinic hydrocarbons of normally liquid character are quite suitable in the process of the invention as shown in Example VI below.

*Example VI*

The charge in this instance amounted to about 26 parts of magnesium hydride, 140 parts of 1-pentene, $C_5H_{10}$, and 500 parts of dimethyl sulfone, $(CH_3)_2SO_2$. The operating conditions employed are about 120° C., and a reaction period of 4 to about 5 hours. No significant applied pressure is involved here, but owing to the conditions of operation and the vapor pressure of the pentene and of the diethyl sulfone, an operating pressure of about 100 pounds per square inch (about 7 atmospheres) is provided. At the conclusion of this operation, a good yield of di-2-pentyl magnesium is achieved.

When desired, alkyl magnesium compounds having dissimilar alkyl substituents can be provided, and is shown in the following example.

*Example VII*

In this operation, the charge employed is similar to the charge provided in Example I, except that the reaction medium comprises 15,000 parts of diisopropyl sulfone. In carrying out the reaction, ethylene and propylene partial pressures of roughly equal magnitude and accumulating to a total operating pressure of about 1,500 pounds per square inch are established on the system. Upon continuing the reaction for 2 to 8 hours, a good conversion to the dialkyl compounds of magnesium are provided, including diethyl magnesium, diisopropyl magnesium, and ethyl isopropyl magnesium, with the mixed alkyl product being predominant.

When mixed alkyl derivatives are desired particularly, it is frequently advantageous to carry out the operation in a plurality of steps to achieve an even higher product distribution to the alkyl magnesium compounds having dissimilar alkyl substituents. This is illustrated in the following example:

*Example VIII*

In this operation, approximately the same conditions and initial charge as provided in Example VII is employed, except that the reaction period is divided into two segments. In the first operation, ethylene pressure is imposed at a level of about 66 atmospheres for a period of about 1 to 20 hours, and following this period, the ethylene pressure is vented and then a propylene pressure of similar magnitude is applied for a similar period. Upon conclusion of these operations, the reaction contents is cooled to substantially ambient temperatures as in other operations, and upon separating the reaction medium, a good yield of ethyl isopropyl magnesium is provided.

From the examples given above, it is seen that the present invention provides a highly effective method for the manufacture of the desired alkyl or related magnesium compounds. The effectiveness of the process is due largely to the efficacy of the coordinating sulfur compounds employed as reaction media. As further evidence from the examples given above, the reaction medium facilitates the separation of the desired product from unreacted magnesium hydrides, particularly when the quantity of reaction medium is adjusted to assure full solution of the alkyl magnesium compound formed. Although the separation of the product compound from the solvent or reacting medium is usually accomplished by vacuum distillation of the coordinating sulfur compound, other procedures can be used. For example a crystallization by lowering the temperature, or a precipitation by salting out with another liquid, are readily available methods.

The proportions of coordinating liquid sulfur compound employed, then, can be greatly varied, the quantity of magnesium hydride being from less than one percent to up to, for example, 10 percent of the sulfur compound, or, alternatively expressed, a liquid:solid ratio of from 10 to over 100 to 1.

The reaction periods employed can be varied through a wide range. Generally, a period of at least 30 minutes, and usually, at least 1 hour, at reaction conditions is required. Total reaction periods of up to 20 hours are frequently employed.

As discussed briefly heretofore, the employment of supra-atmoshperic pressures is not a controlling condition of operation in the various embodiments of the invention. The effect of pressure is significantly more pronounced in the case of the normally gaseous olefins including particularly ethylene, and less particularly propylene and butylene. The use of high pressures in the higher range is found to expedite the speed of reaction in these instances, but is sometimes accompanied by an increase in the amount of polymeric by-products, or the transition of the alkyl compound desired to an alkyl compound of longer chain length. Thus, when an ethylene pressure of the order of 4,000 pounds per square inch gauge is applied, there is a strong tendency to provide a higher proportion of butyl magnesium compounds than of the desired diethyl magnesium compound in that particular embodiment. However, this feature is sometimes used to advantage when the concurrent formation of an alkyl compound and an increase in the effective hydrocarbon substituent chain length is desired. In conjunction with pressures, temperature also effects the type of products achieved. The effect of temperature is variable, but in most instances, the increase in temperature tends to prevent the growth of longer alkyl substituents. Hence, for the most effective types of commercial operation, and effected by the economics of the type of apparatus and compression equipment required, it is found advantageous, with the gaseous olefins, to operate at high temperatures and higher pressures to expedite the speed of operation. Thus, when carrying out the operation illustrated by Example I, but employing an ethylene pressure of about 4,200 pounds per square inch and operating at a temperature of from 150 to 200° C., appreciably more rapid reaction is achieved, the actual yield of diethyl magnesium based on the magnesium hydride reacted or converted is somewhat lower than in Example I. In the case of the normally liquid olefins, such as the butenes, pentenes or even higher olefins, higher temperatures are similarly beneficial with respect to the rate of conversion of the magnesium hydride, but the products are to some degree degraded by the conditions of operation, that is, splitting off of olefins occurs so that a high degree of uniformity of isolated product is more difficult to achieve.

In some cases, the coordinating solvent employed or, the coordinating sulfur compound may be, normally, a solid or a relatively high melting liquid, relative to the conditions of operation. The present invention does not preclude the presence of supplemental inert organic materials for the purpose of solubilizing or liquefying the coordinating sulfur compound component at the very start or at the formation of the reaction charge. Thus, when desired, alkane type hydrocarbon liquids or solvents such as parafinic naphthas, or hexane, heptane or other inert hydrocarbon liquid media can be employed in certain proportions at the very start of the operation. It will be understood, however, that the requisite quantity of the coordinating sulfur type compound is provided to implement the reaction and the subsequent isolation of the alkyl magnesium compound.

The proportions of magnesium hydride employed in cyclic type operations, or in continuous operations, relative to the quantity of olefin hydrocarbon present at any given time, is not a sacramental or critical factor. However, the relative quantity of magnesium hydride is important to the economics and effectiveness of overall operations. In addition the magnesium hydride should be in a highly subdivided state, although again this is not a highly critical factor to operability. It is preferred that the magnesium hydride include a substantial, and preferably, a majority, of particles which would pass through a 100 mesh screen. However, when this condition is not readily realizable, coarser material charges are quite satisfactory but have an effect on the rate of reaction of the olefin with the magnesium hydride. With respect to the relative proportions, it is preferred that the magnesium hydride at any particular time be present in substantial stoichiometric excess to the amount of the olefin then present. This condition is easily realizable in the case of operations wherein the olefin is supplied by imposing gaseous pressure. The olefin applied as a gas feed is normally present in the reaction zone in only minor relative quantities. In the case of liquid olefins, it is desirable that the quantity of magnesium hydride is from 2 to 10 times the stoichiometric requirement posed on the olefin charged initially.

Having described the invention and the embodiments thereof in some detail, what is claimed is as follows:

1. The process of making an alkyl magnesium compound comprising reacting magnesium hydride with an olefin hydrocarbon in a liquid reaction medium including a coordinating sulfur compound selected from the group consisting of a thioether, a sulfoxide, and a sulfone.

2. The process of making and recovering an alkyl magnesium compound comprising reacting sub-divided magnesium hydride with an olefin hydrocarbon in a liquid reaction medium, said reaction medium including a coordinating sulfur compound selected from the group consisting of a thioether, a sulfoxide, and a sulfone, the reaction medium being a solvent for the alkyl magnesium compound, the reaction being carried out at a temperature of from about 50 to 200° C. and for a reaction period of from about 1 to 20 hours, then withdrawing from the reaction at least part of the liquid phase and separating the reaction medium from the alkyl magnesium compound formed.

3. The process of making diethyl magnesium comprising treating subdivided magnesium hydride with ethylene in the presence of a coordinating sulfur compound comprising dimethyl sulfoxide.

4. The process of making diisopropyl magnesium comprising treating subdivided magnesium hydride with propylene in the presence of a coordinating sulfur compound comprising diphenyl sulfoxide.

5. The process of making diethyl magnesium comprising treating subdivided magnesium hydride with ethylene in the presence of a coordinating sulfur compound comprising diethyl thioether.

References Cited in the file of this patent

FOREIGN PATENTS

| 763,047 | Great Britain | Dec. 5, 1956 |
| 763,825 | Great Britain | Dec. 19, 1956 |